United States Patent [19]
Scott

[11] Patent Number: 5,355,667
[45] Date of Patent: Oct. 18, 1994

[54] SINGLE ROW GRAPE AND RAISIN HARVESTER

[75] Inventor: Phillip R. Scott, Madera, Calif.

[73] Assignee: FMC Corporation, Chicago, Ill.

[21] Appl. No.: 947,626

[22] Filed: Sep. 21, 1992

[51] Int. Cl.⁵ .......................................... A01D 46/00
[52] U.S. Cl. ...................................... 56/330; 56/328.1
[58] Field of Search .................. 56/328.1, 330, 340.1, 56/331–DIG. 2, 14.5; 460/114

[56] References Cited

U.S. PATENT DOCUMENTS

| | | | |
|---|---|---|---|
| 3,328,944 | 7/1967 | Shepardson | 56/331 |
| 3,340,935 | 9/1967 | Csimma | 460/114 |
| 3,546,856 | 12/1970 | Hiyama | 56/330 |
| 3,601,965 | 8/1971 | Kaessbohrer et al. | 56/330 |
| 4,283,906 | 8/1981 | Scudder | 56/330 |
| 4,329,836 | 5/1982 | Scudder | 56/330 |
| 4,336,682 | 6/1982 | Orlando | 56/330 |
| 4,341,062 | 7/1982 | Scudder | 56/330 |
| 4,418,521 | 12/1983 | Orlando et al. | 56/330 |
| 4,432,190 | 2/1984 | Orlando | 56/1 |
| 4,800,902 | 1/1989 | Maust | 460/114 |
| 4,860,529 | 8/1989 | Peterson et al. | 56/330 |
| 5,113,644 | 5/1992 | Windemuller et al. | 56/330 |

Primary Examiner—Mark Rosenbaum
Assistant Examiner—John M. Husar
Attorney, Agent, or Firm—M. B. Lee; R. C. Kamp; R. B. Megley

[57] ABSTRACT

A single head grape and raisin harvester is disclosed having a single driven oscillating shaker head mounted on a sub-frame enabling the shaker head to center itself on the row of grape vines being harvested. The single row harvester is also provided with a stretchable conveyor belt mounted on interconnected plastic chain links for reliably transporting grapes or raisins to an elongated discharge conveyor which is positioned transversely when collecting and discharging grapes from the harvester into trucks or boxes and is pivoted parallel to the longitudinal axis of the vehicle when moving along roadways.

15 Claims, 7 Drawing Sheets

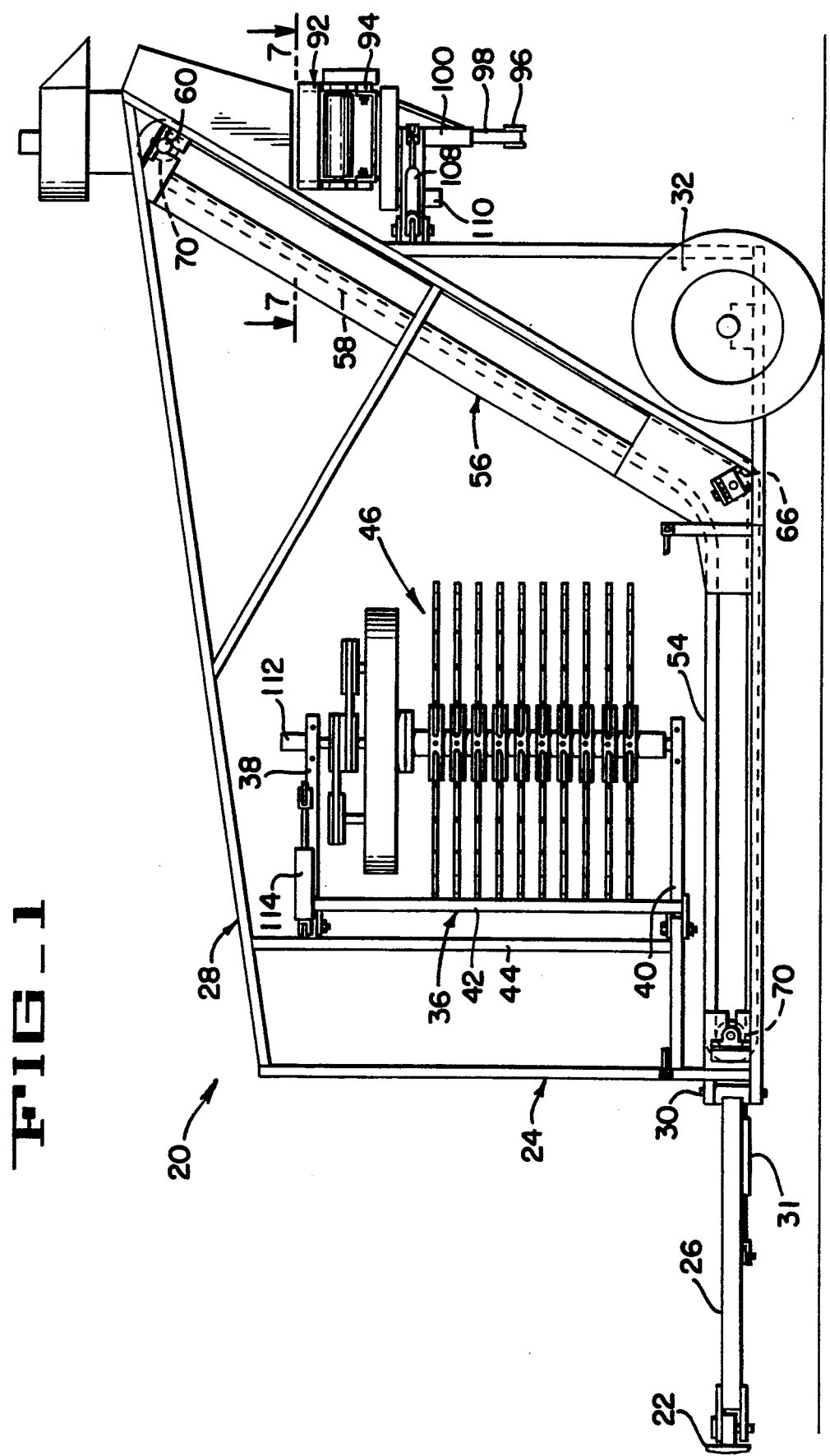

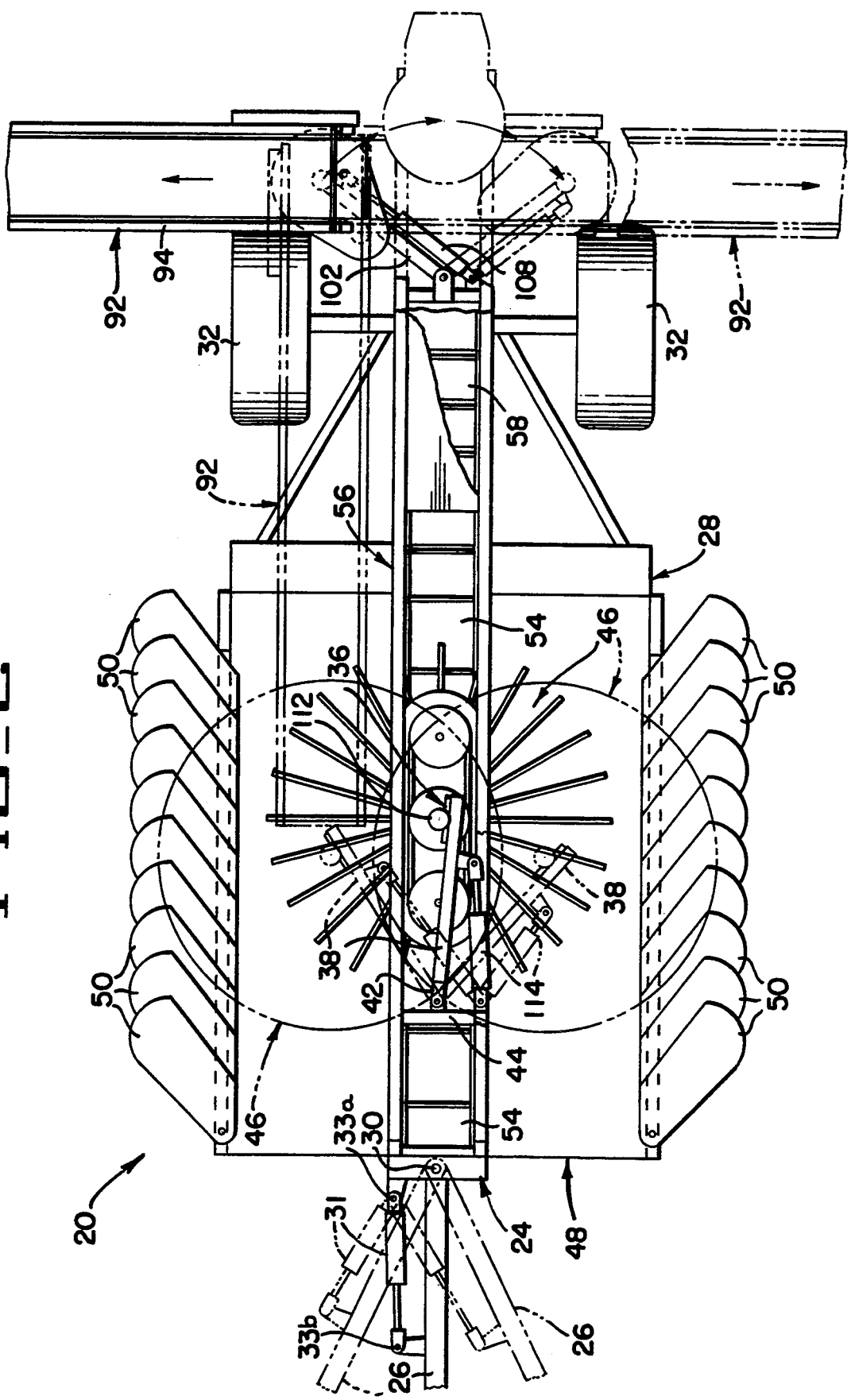
FIG_2

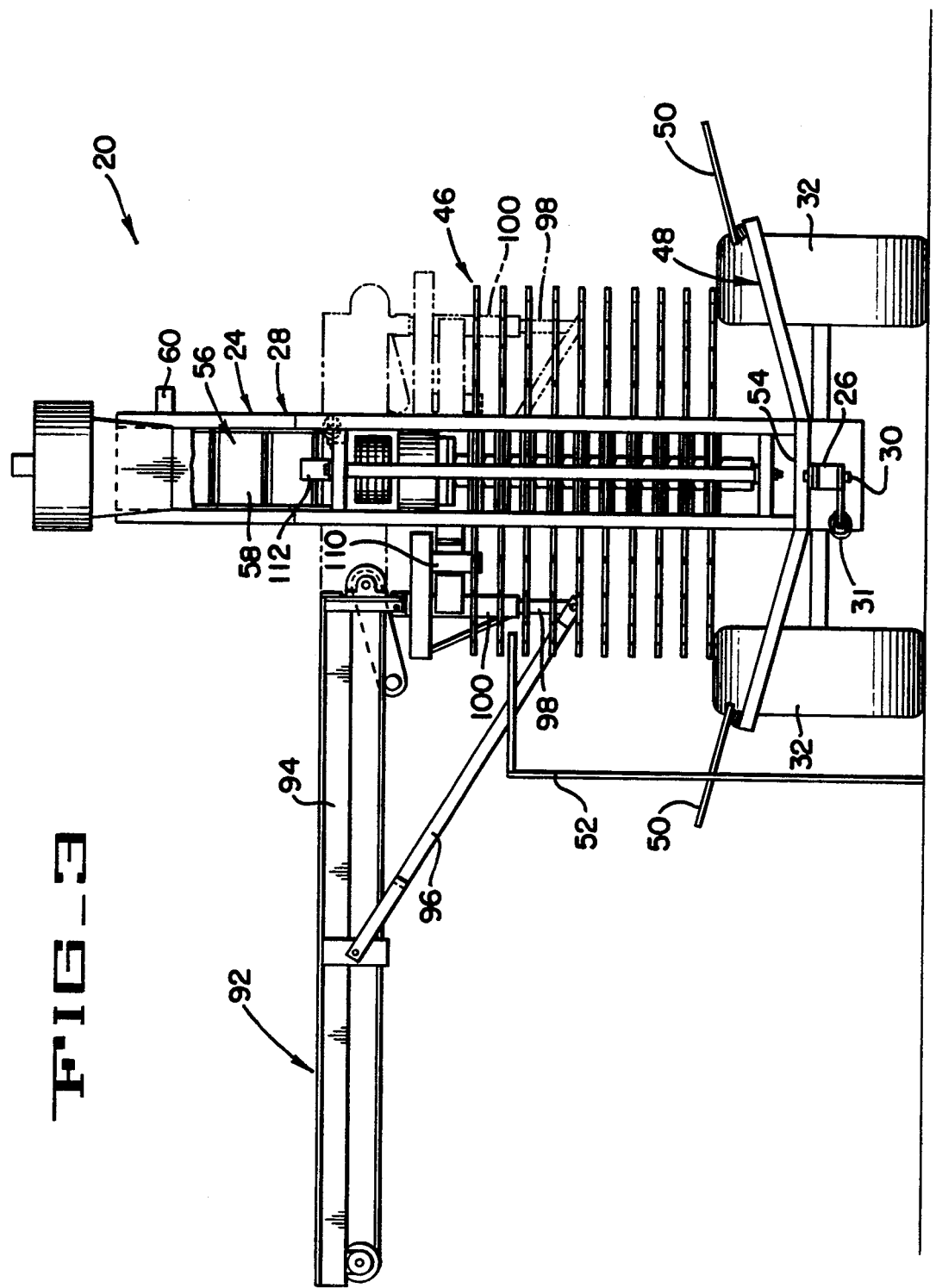

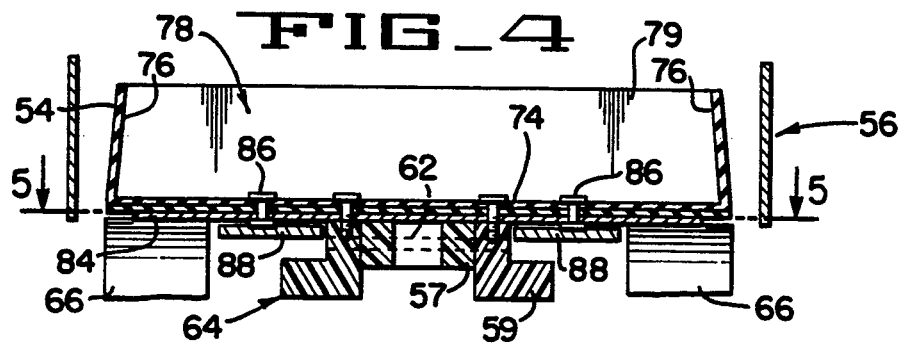
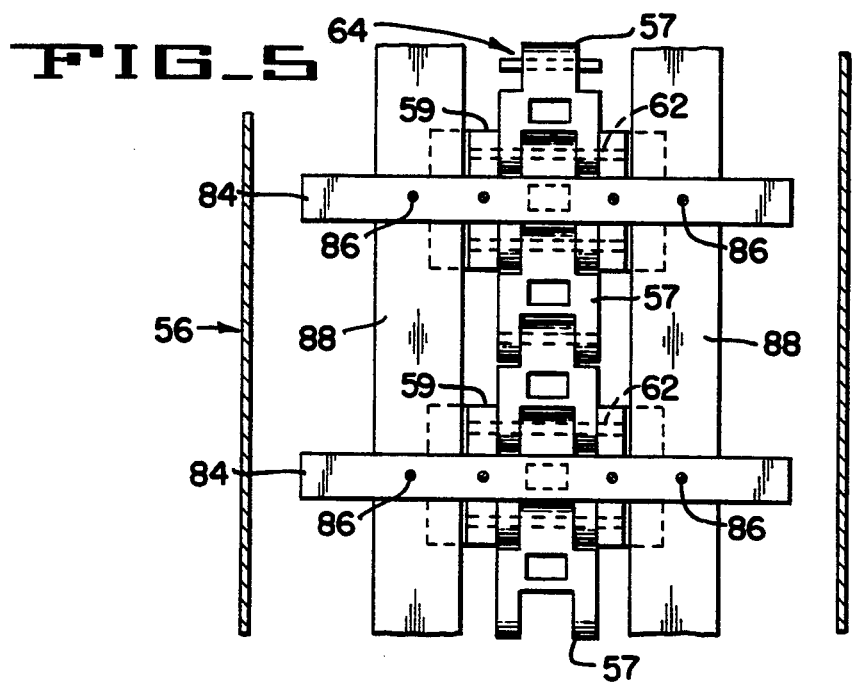
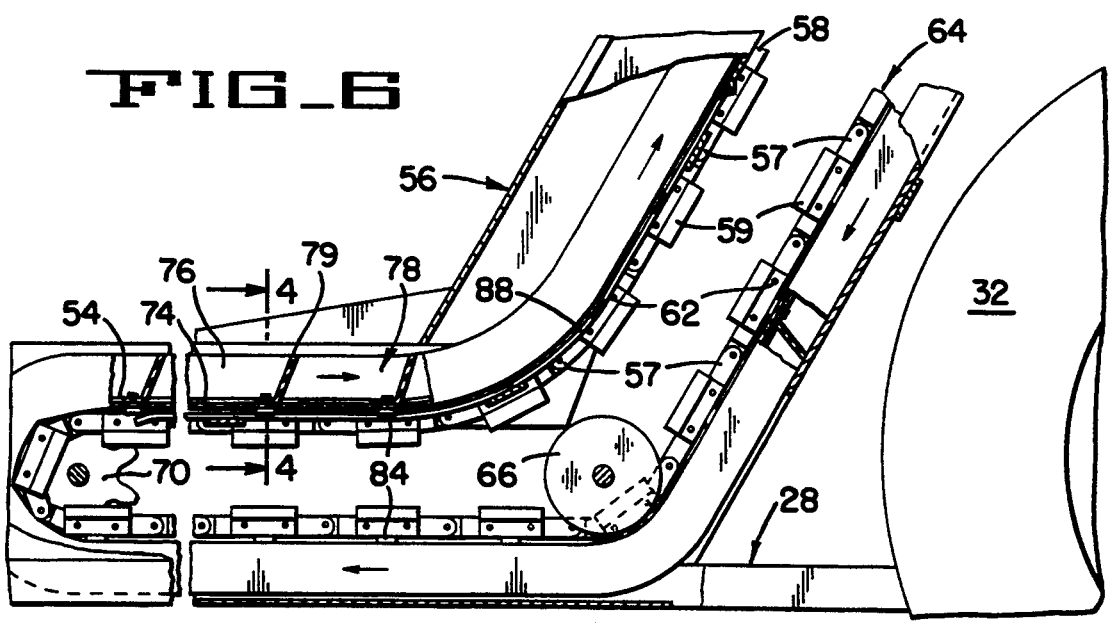

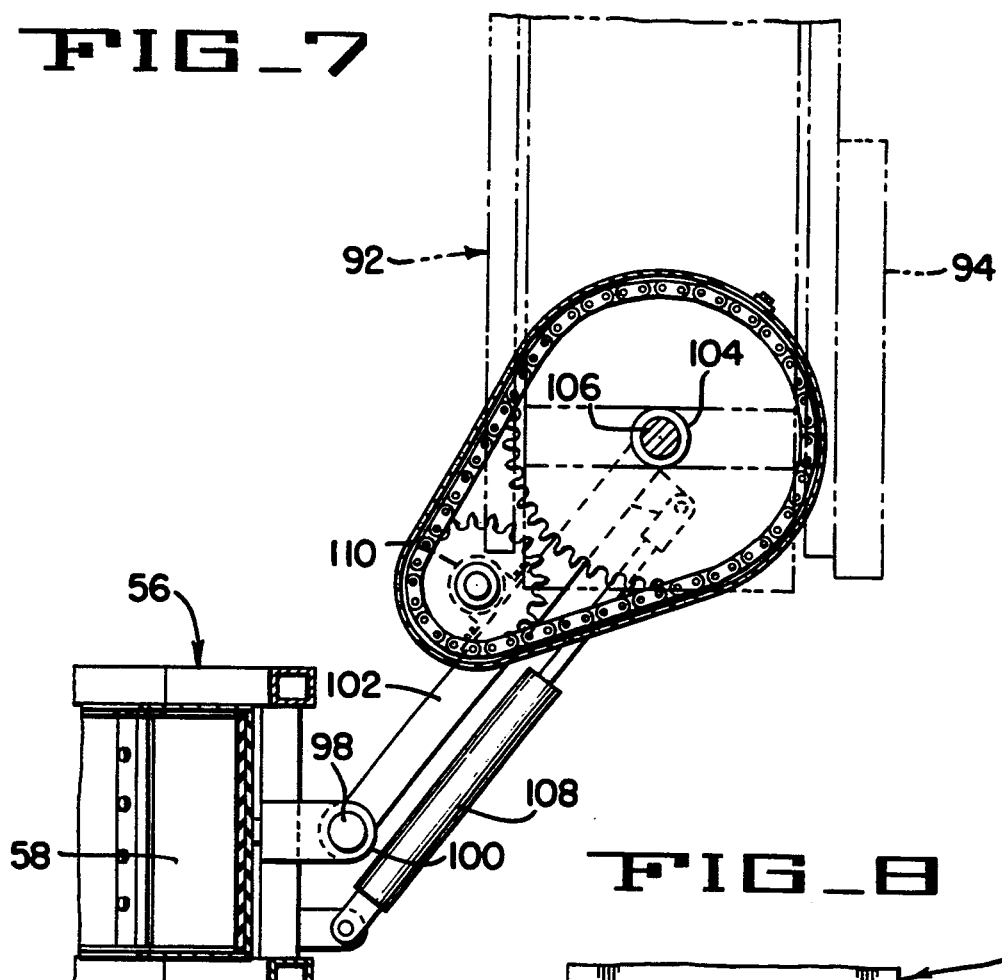
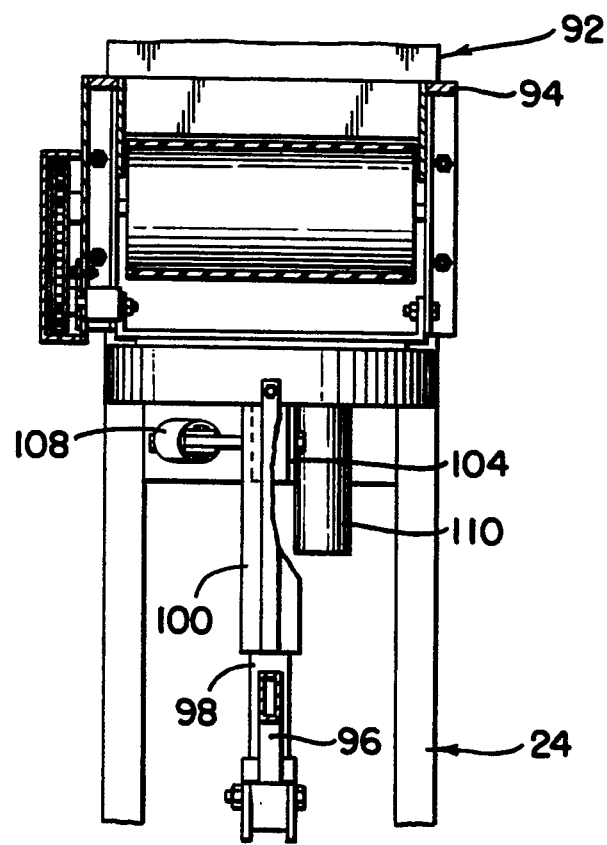

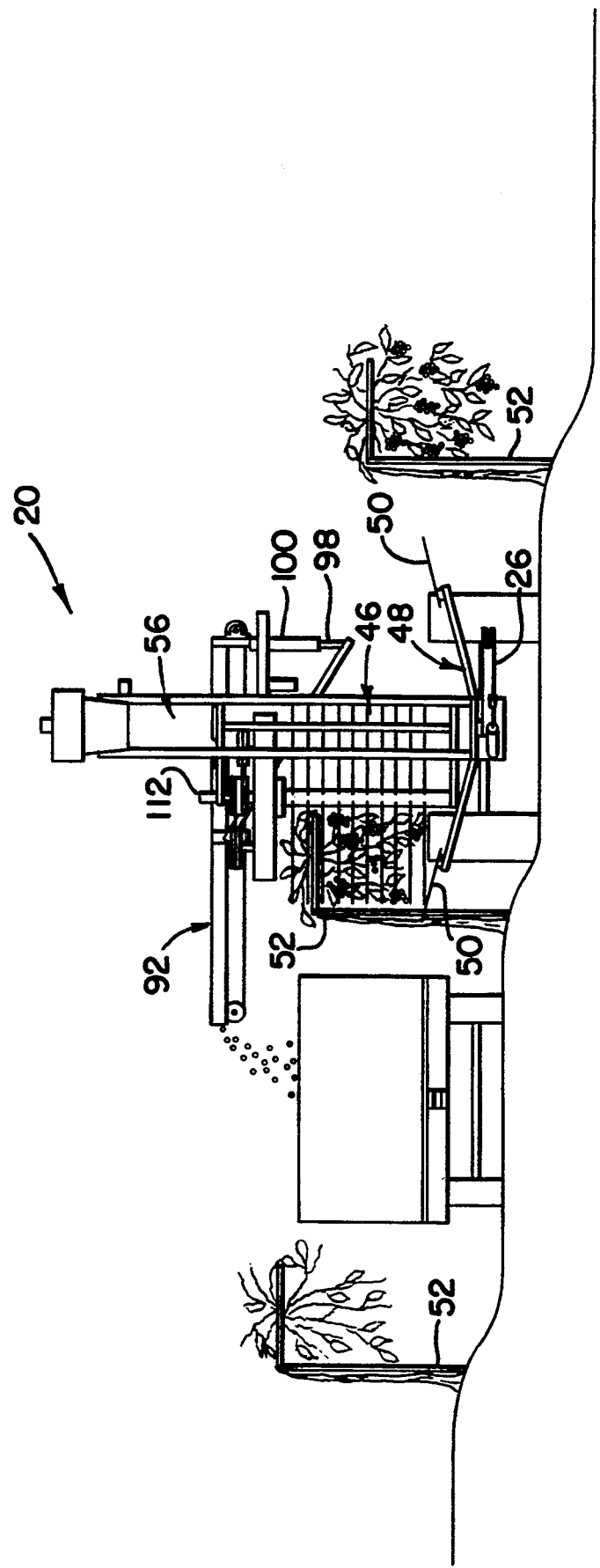

FIG_10
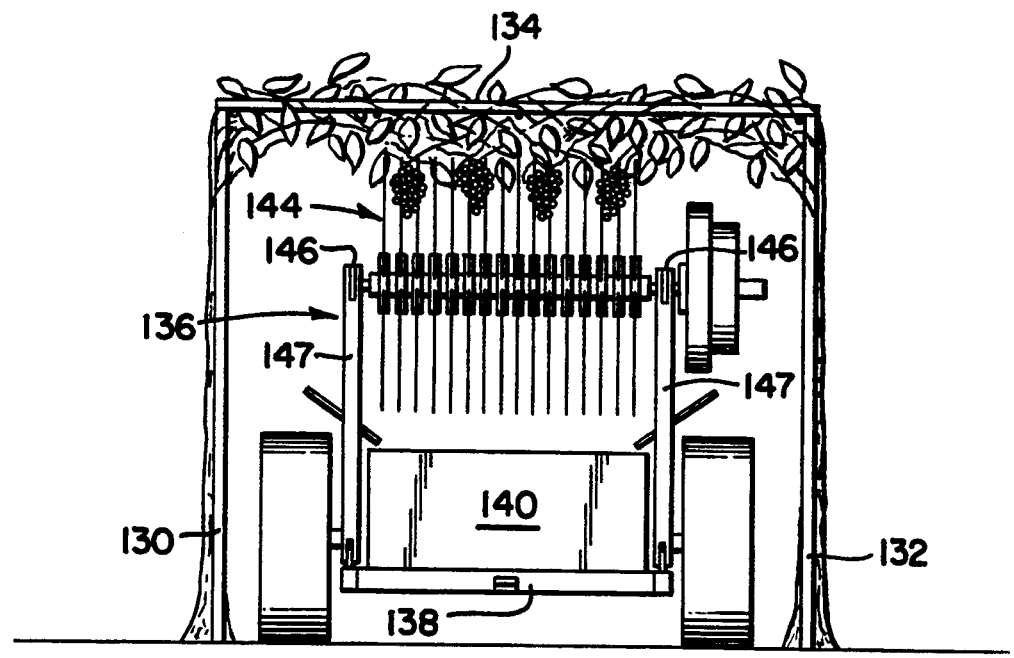
FIG_11
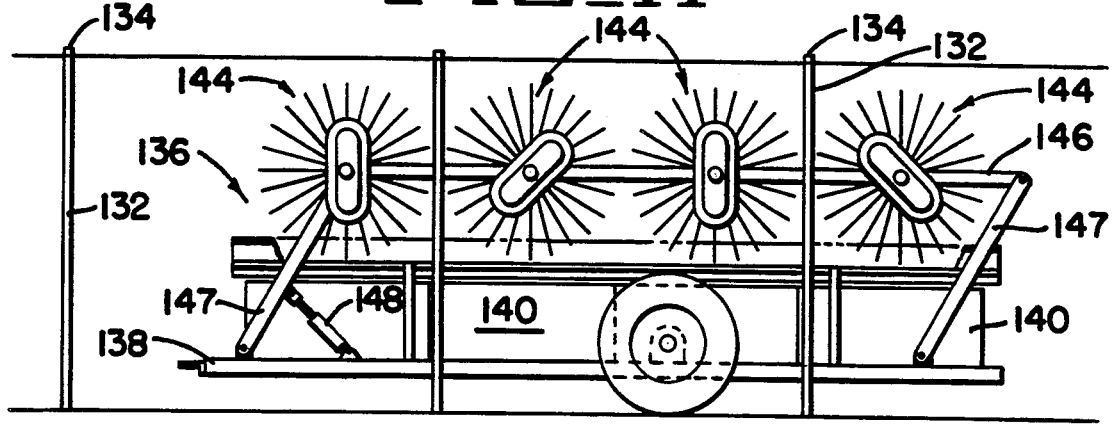
FIG_12
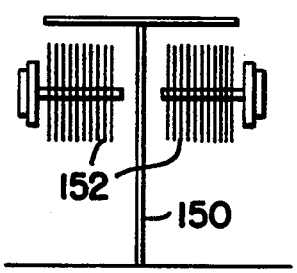
FIG_13
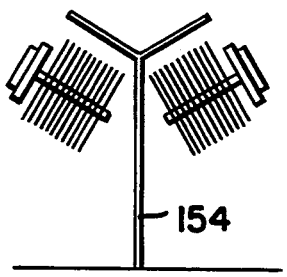
FIG_14
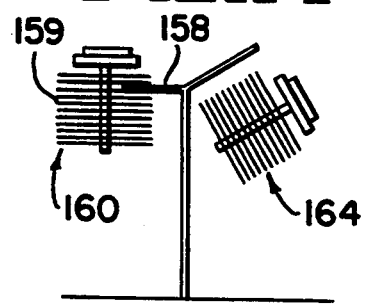

SINGLE ROW GRAPE AND RAISIN HARVESTER

BACKGROUND OF THE INVENTION

1. Field of the Invention

The present invention relates to grape and raisin harvesters and more specifically to a tractor drawn, single row harvester for harvesting grapes supported on grape vines. Alternately, the harvester can be used to harvest dry grapes which are supported on vines that have been severed from the trunks of the vines and left to dry in the sun while supported on vines as raisins before being shook from the vines by the single row harvester and collected by the single row harvester of the present invention.

2. Description of the Prior Art

Assignee's Orlando Patent No. 4,336,682 and divisional Patent No. 4,432,190 covers an apparatus for shaking grapes from vines by using eccentric weights which are mounted on shaker arms which have spaced elongated striker bars that are oscillated against the trunks of the grape vines and posts which support trellis wires that have clusters of grapes trained thereover that fall on take-away conveyors for transfer to collecting means.

Assignee's Orlando Patent No. 4,418,521 is similar to the two above Orlando patents except that striker bars are used to resiliently whip the foliage hanging from the trellis wires that are supported on posts.

Assignee's Scudder Patent No. 3,341,062 discloses a coffee harvester which utilizes an eccentric weight arrangement mounted on the upper ends of two shaker units for oscillating shafts carrying tines which dislodge coffee beans from the plants.

Assignee's Scudder Patent No. 4,329,836 discloses a tractor drawn trailer having a vertical wall to which cantilever beams are pivotally connected. A single oscillating shaker unit is journaled within the two beams for moving the single oscillating shaker units different distances from the vines being harvested. A pair of hydraulic cylinders are connected to rear wheels to maintain the axis of the shaker unit substantially vertical when harvesting fruit such as berries and coffee.

SUMMARY OF THE INVENTION

The present invention relates to single row grape and raisin harvesters adapted to remove clusters of grapes from the vines. Alternately, the clusters of grapes may be supported on vines that have been severed from the trunk of the vines, but rest on the foliage or supported by trellis wires that are secured to posts. These clusters of grapes are left in the sun until they dry as raisins and are subsequently harvested by the grape and raisin harvester of the present invention for sale as grapes or raisins.

BRIEF DESCRIPTION OF THE DRAWINGS

FIG. 1 is a side elevation of a tractor towed and powered single row grape and raisin harvester, with only the tongue of the tractor being shown.

FIG. 2 is a plan view of the single row harvester of FIG. 1 with several components shown in phantom lines in different positions.

FIG. 3 is a front view of the harvester having its discharge conveyor projecting transversely of the longitudinal axis of the single row grape and raisin harvester with the discharge conveyor in its operative position to transfer grapes from an elevator to a truck or the like.

FIG. 4 is a section taken along lines 4—4 of FIG. 6 illustrating the cross-section of a grape or raisin discharge conveyor and elevator.

FIG. 5 is a section taken along lines 5—5 of FIG. 4 illustrating a plastic conveyor chain.

FIG. 6 is a cut away view of a discharge conveyor-elevator illustrating the internal components of the conveyor-elevator.

FIG. 7 is a section taken along lines 7—7 of FIG. 1 illustrating a system for selectively transferring the discharge conveyor between both sides of the harvester and a stowed position.

FIG. 8 is an elevation with parts cut away illustrating the drive for the discharge conveyor including means for supporting the discharge conveyor.

FIG. 9 is an operational view illustrating the grape and raisin harvester moving through terraced rows of the grapes.

FIG. 10 is a front elevation of a modified tractor drawn and powered harvester which shakes grapes hanging from horizontal beams which extends between two rows of grape vines and are shook from the vines into boxes by a plurality of horizontal shaker tines of the shaker head.

FIG. 11 is a side elevation of the modified tractor drawn power driven harvester of FIG. 10.

FIG. 12 is a diagrammatic elevation illustrating two horizontal shaker heads which harvest grapes or raisins frown beneath a horizontal trellis.

FIG. 13 is similar to FIG. 12 but has a V-shaped trellis with two inclined shaker heads positioned below the trellis for shaking grapes therefrom.

FIG. 14 is similar to FIG. 13 but with a first shaker head oriented vertically, and a second shaking head oriented at an angle of about 30° relative to the ground.

DESCRIPTION OF THE PREFERRED EMBODIMENT

The present invention relates to a small, single row grape and raisin harvester 20 (FIGS. 1-9) which is connected to a conventional tractor, only a portion of the tractor's draw bar 22 being shown in FIG. 1. The tractor's draw bar 22 is pivotally connected to the harvester's frame 24 by a tongue 26 for pulling the harvester 20 through rows of grape vines as shown in FIG. 9. The tractor provides hydraulic and electrical power to the harvester components for harvesting grapes or raisins during the daylight and at night.

As best illustrated in FIG. 1, the harvester's tongue 26 is pivotally connected to the tractor's draw bar 22 (FIG. 1), and to the main frame 28 of the harvester 20 by a pivot pin 30. A hydraulic cylinder 31 is pivotally connected between pivot pins 33a and 33b (FIG. 2) which permits the operator to pivot the tongue 26 between the three positions illustrated in FIG. 2.

The small grape and raisin harvester 20 has a length of about 19 feet, a width of about 6 feet, and a height of about 10 feet.

The rear portion of the harvester 20 is supported by pair of large rear wheels 32 journaled on the harvester's main frame 28, while the front portion of the harvester is supported by the tractor 22 as mentioned previously.

As best shown in FIGS. 1 and 2, a pivotal shaker head frame 36 (FIG. 1) includes a pair of horizontal arms 38 and 40 which are rigidly secured to a pivotal upright frame member 42 thereby forming the rigid shaker head frame 36 (FIG. 1). The frame 36 is pivotally connected to another upright frame member 44 (FIG. 1) of the harvester's main frame 28. As best shown in FIGS. 1 and 2, a single shaking head 46 is pivotally supported on the shaking head frame 36 for oscillatory movement and is of the type disclosed in Applicant's previously mentioned Scudder Patent No. 4,341,062 which is assigned to the assignee of the present invention and is incorporated by reference herein. It will be noted that the Scudder patent includes shaker tines some of which are angled upwardly or downwardly rather than horizontally as in the subject invention.

As illustrated in FIGS. 2 and 3, the hydraulic cylinder 31 (FIGS. 1 and 2) is connected between the tongue 26 of the harvester harvester's frame 24 (FIG. 2). The hydraulic cylinder 31 is pivotally connected between the main frame 24 of the harvester 20 and the harvester's tongue 26 thereby allowing the operator when on the tractor (not shown) to actuate the hydraulic cylinder 31 to pull the harvester 20 along a linear path behind the tractor 22 (FIG. 1), or to pivot the harvester tongue 26 so that the path of the harvester is to the right or left of the longitudinal axis of the tractor (not shown). In this way the operator when on the tractor may guide the harvester 20 by actuating the cylinder 31 (FIG. 2) right or left as required to shake the grapes off the vines while the tractor is positioned to the right or left of the vines being harvested.

Having reference to FIGS. 1, 2 and 3, the grapes or raisins are shaken from the vines onto a generally V-shaped trough 48 (FIG. 3) having spring loaded plates 50 which are positioned to contact trellis poles 52 (FIG. 3) and/or the trunks of the vines (not shown) and deflect the grapes into the V-shaped trough 48. The V-shaped trough 48 first guides the grapes or raisins into a horizontal portion 54 of the single conveying system 56 (FIGS. 4, 5 and 6). The single conveying system includes both the horizontal portions 54 (FIGS. 1 and 6) and an upwardly inclined portion 58. A hydraulic motor 60 (FIGS. 1 and 3) drives both the horizontal portion 54 and the upwardly inclined portion 58 of the conveyor 56.

As illustrated in FIGS. 4, 5 and 6, the single conveying system 56 includes a plurality of plastic links 57 and 59 pivotally connected together by elongated bolts 62 defined by an endless plastic chain 64 (FIGS. 4, 5 and 6). End portions and intermediate portions of the plastic chain 64 (FIGS. 1 and 6) are trained around plastic wheels 66 and sprockets 70 (FIGS. 1 and 6). The upper chain supporting shaft is driven by the hydraulic motor 60 (FIG. 1).

As indicated in FIGS. 4 and 6, a stretchable rubber belt 74 includes inclined side walls 76. A plurality of grape receiving pockets 78 are formed from the stretchable rubber belt 74, its inclined side walls 76 and a plurality of grape receiving transverse pushers 79 which define pockets 80 that maintain the grapes therein when moving up the inclined path.

The single conveying system 56 includes the stretchable rubber belt 74, the grape receiving pockets 80 and the inwardly inclined side walls 76 (FIG. 4) all of which are riveted to the steel strip 84. Also, the rubber belt 74, the grape receiving pockets 80 (FIGS. 4 and 5) and the steel strips 84 are riveted together.

As illustrated in FIG. 4, the rivets 86 are slidably received on the steel guide plates 88 during the travel of the conveyor 56 through the grape harvester 20.

Having reference to FIGS. 1-3, 7 and 8, a discharge conveyor 92 is supported in a discharge conveyor frame 94. A diagonal strut 96 (FIG. 3) is connected between a portion of the conveyor frame 94, and a vertical rotatable shaft 98 which is free to pivot within a vertical tube 100. The lower end of the shaft 98 is bolted to the lower end of the diagonal strut 96 as illustrated in FIG. 3.

FIG. 7 is a horizontal section taken along lines 7—7 of FIG. 1 illustrating a pivot arm 102 pivotally connected within a vertical tube 100 (FIGS. 3 and 7) having the shaft 98 projecting out of the tube 100. The other end of the pivot arm 102 is connected to a tube 104 having a shaft 106 pivotable therein which shaft 106 is rigidly connected to the discharge conveyor frame 94 (FIG. 7).

As best illustrated in FIGS. 2 and 7, the hydraulic cylinder 108 is pivotally connected between the pivot arm 102 and the harvester frame 24. Actuation of the hydraulic cylinder 108 (FIG. 2) will cause the discharge conveyor 92 to be selectively extended to the right or left as illustrated in FIG. 2. Alternately, the conveyor 92 may be moved to a transport position parallel to the longitudinal axis of the harvester as indicated in phantom lines in FIG. 2.

A hydraulic motor 110 (FIGS. 1-3) is provided for pivoting the discharge conveyor 92 between the three positions illustrated in FIG. 2. As best illustrated in FIG. 1, a hydraulic motor 112 is provided to oscillate the single shaking head 46 (FIGS. 1 and 3), and a hydraulic cylinder 114 (FIG. 2) is provided for pivoting the shaker head into a plurality of positions, only three positions being illustrated in FIG. 2. The hydraulic cylinder 31 (FIGS. 1-3) is provided to move the harvester 20 closer to the trellis posts 120 (FIG. 9) of the grape vines being harvested while the tractor which pulls the harvester 20 will travel along a route spaced from the vines.

FIG. 9 is an operational view of the harvester in operational position on a terraced vineyard illustrating the harvester 20 shaking grapes from the vines in one row. The harvested grapes fall into the V-shaped trough 48 for conveyance up the single conveying system 56 for discharge on the discharge conveyor 92 which deposits the harvested grapes into a truck for transportation to the market or to a winery.

FIG. 10 illustrates two rows of trellis posts 130 and 132 having a horizontal beam 134 connected to the top of the posts with grapes and grape vines trained over the beams 134.

A tractor (not shown) is connected to the harvester 136 for pulling the harvester between the trellis posts 130 and 132 and for providing hydraulic and electrical power to the harvester for enabling the harvester to harvest the grapes and/or raisins during daylight or at night.

As illustrated in FIG. 11, the harvester 136 is in the form of a two wheel trailer having a platform 138 for supporting several boxes 140 for receiving grapes shaken from the vines.

A plurality of horizontally positioned power driven shaker heads 144 are rotatably supported on two pairs of parallel beams 146. The shaker heads 144 are the same as the shaker head 46 (FIG. 1) but are oriented horizontally rather than vertically as shown in FIG. 1.

As illustrated in FIG. 11, the beams 146 are pivotally connected to the platform 138 by four parallelogram linkages 147, and a pair of hydraulic cylinders 148, only one being shown in FIG. 11. As is apparent in FIG. 11, the hydraulic cylinders 148 are actuated to raise or lower the shaker heads 144 for shaking the grapes from the overhanging vines which grapes fall into the boxes 140.

FIGS. 12, 13 and 14 diagrammatically illustrate different relationships between the shapes of the trellises and the orientation of the shaking heads. FIG. 12 illustrates a T-shaped trellis 150 with shaker heads 152 mounted horizontally which is desirable with young grape vines having the clusters of grapes hanging only a short distance from the top of the T-shaped trellis.

FIG. 13 illustrates a Y-shaped trellis 154 having their upper ends angled at 30° relative to the ground and also having the axes of the shaker heads at 30° relative to the ground. FIG. 14 illustrates a trellis post having a horizontal portion 158 which intermeshes with the tines 159 of a vertically oriented shaker head 160, and a second shaker head 164 having an axis which is oriented at 30° to the ground.

From the foregoing description it will be apparent that the single row grape and raisin harvester of the present invention is adapted to harvest dry grapes which are supported on vines which are harvested as raisins. Alternately, the harvester can harvest ripe grapes still attached to the vine and nourished by nutrients in the soil and sold as wine grapes or commercial grapes consumed by the public. The single row harvester is easily adapted to harvest the grapes or raisins from terraced rows of grape vines.

Although the best mode contemplated for carrying out the present invention has been shown and described it will be understood that modification and variation may be made without departing from what is regarded to be the subject matter of the invention.

What is claimed is:

1. A mobile harvester for harvesting crops when trained over horizontal beams supported by trellis posts, comprising:
    means defining a mobile power driven vehicle connected to said harvester for moving the harvester under a row of plants and for providing hydraulic and electrical power to said harvester;
    means defining a trailer supporting said harvester and having two upstanding pairs of parallelogram linkages pivotally connected to said mobile power driven vehicle having a platform for supporting several boxes which receive crops shaken from overhead vines;
    means defining a plurality of horizontal parallel beams pivotally connected to the upper ends of said parallelogram linkages; and
    means defining a plurality of horizontally positioned power driven shaker heads pivotally connected to said horizontal parallel beams for shaking the overhead vines and for collecting the crops from the vines for collection in said boxes.

2. An apparatus according to claim 1 wherein each of said shaker heads are independently driven relative to each other.

3. An apparatus according to claim 1 wherein each adjacent shaker head is oscillated in a direction opposite to the adjacent shaker head.

4. An apparatus according to claim 1 wherein said shaker heads may be in horizontal alignment and be shaken in opposite directions for providing greater agitation to the vines and more effective dislodgement of the crops.

5. In a mobile force balanced crop harvester having a main frame for harvesting crops comprising:
    a discharge conveyor frame pivotally connected to said main harvester frame for selective pivotal movement about a pair of vertical axes; a third vertical axis for pivotally supporting one end of said discharge conveyor frame for pivotal movement about a first vertical axis;
    first power means for raising and lowering said discharge conveyor; and
    second power means for translating said discharge conveyor between a position parallel to the longitudinal axis of the harvester and positions normal to the longitudinal axis of the harvester.

6. A harvester, for harvesting crops from plants, wherein the harvester is to be pulled by a power driven vehicle with a drawing means and with a direction of forward movement with a longitudinal axis in the direction of forward movement and a right side of the forward direction and a left side of the forward direction, the harvester, comprising:
    a frame;
    a vertical shaker head mounted on the frame, having tines projecting outwardly from the shaker head for engaging the plants and shaking the crops from the plants;
    means for catching crop shaken from the plants;
    means for connecting the frame to the power driven vehicle; and
    means for moving the frame toward the right side of the forward direction, and for moving the frame toward the left side of the forward direction.

7. The harvester, as claimed in claim 6, wherein the means for connecting the frame to the power driven vehicle, comprises a tongue capable of being pivotably connected to the drawing means of the power driven vehicle and pivotably connected to the frame.

8. The harvester, as claimed in claim 7, wherein the means for moving the frame, comprises a hydraulic cylinder mechanically connected between the tongue and the frame.

9. The harvester, as claimed in claim 8, wherein the vertical shaker head comprises:
    a vertical brush; and
    means for oscillating the vertical brush.

10. The harvester, as claimed in claim 9, further comprising, a power means for arcuately moving the vertical brush into contact with the plants.

11. The harvester, as claimed in claim 6, wherein the means for catching crop, comprises:
    a platform;
    a first plurality of spring loaded plates on the right side of the platform; and
    a second plurality of spring loaded plates on the left side of the platform.

12. The harvester, as claimed in claim 11, further comprising, a conveyor passing through the platform.

13. The harvester, as claimed in claim 12, wherein the conveyor comprises a horizontal section, which conveys the corps in a substantially horizontal direction, and an upwardly inclined section, which conveys the corps in an upwardly direction.

14. The harvester, as claimed in claim 12, wherein the platform is V-shaped, wherein the conveyor is at the bottom of the V-shape.

15. The harvester, as claimed in claim 6, further comprising:
    a discharge conveyor; and
    means for swiveling the discharge conveyor to the right of the forward direction, to the left of the forward direction, or to the rear of the harvester.

* * * * *